Jan. 31, 1928.  M. DE MARTELAERE  1,657,527
BOTTLE AND PAN WASHER
Filed Aug. 11, 1927

INVENTOR.
Mathilde DeMartelaere
BY
Thos. J. Donnelly
ATTORNEY.

Patented Jan. 31, 1928.

1,657,527

UNITED STATES PATENT OFFICE.

MATHILDE DE MARTELAERE, OF DETROIT, MICHIGAN.

BOTTLE AND PAN WASHER.

Application filed August 11, 1927. Serial No. 212,162.

My invention relates to a new and useful improvement in a bottle and pan washer, and has for its object the provision of a device which, when inserted in a pan or bottle and rotated, will effectively clean the inner surfaces of the pan or bottle and serve particularly to remove foreign material which is closely clinging to the surface.

Another object of the invention is the provision of a device of this class which will be simple in structure, economical of manufacture and highly efficient in use.

Another object of the invention is the provision of a device for retaining the cleaning member centered relatively to the bottle so that a rapid rotation of the cleaning device relatively to the bottle may be effected.

Other objects will appear hereinafter.

The invention consists in the combination and arrangement of parts hereinafter described and claimed.

The invention will be best understood by a reference to the accompanying drawings which form a part of this specification and in which, Fig. 1 is a central vertical sectional view of a bottle showing the invention applied.

Figure 1:
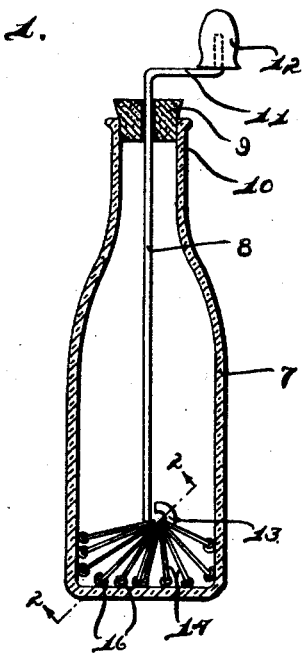

In the invention I have illustrated two forms of the invention, one adapted for cleaning bottles and the other for cleaning pans. In the form shown in Fig. 1 and Fig. 2, I have illustrated the invention adapted for use for cleaning bottles and have shown a bottle 7 in which the bottle cleaner is positioned. A rod 8 is extended through a cork 9 which is adapted to fit in the neck 10 of the bottle and serves as a bearing for the rod 8. The rod 8 is provided with a crank 11 carrying the rotatably mounted knob 12. The lower end of the rod 8 is provided with the eyelet 13, around which are extended the flexible strips 14 preferably made from metal and each curled at its lower end to form an eyelet 15 in which is positioned a plurality of rings 16.

Figure 2:
Fig. 2 is a fragmentary sectional view taken on line 2—2 of Fig. 1.

In operation, after the cork 9 is inserted in the bottle, as shown in Fig. 1, the rod 8 may be rotated so as to whirl the flexible strips 14, thus bringing the rings 16 into engagement with the inner surface of the bottle 7 to effect the desired cleaning. It is evident that as the speed of rotation is increased the centrifugal force will raise the members 14 upwardly to assume a horizontal position, thus bringing the rings 16 into closer contact with the inner surface of the bottle 7.

Figure 3:
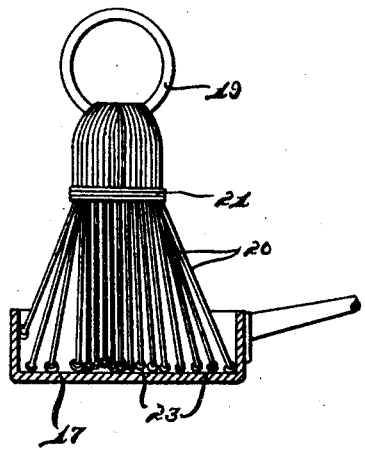
Fig. 3 is a central vertical sectional view of a pan showing the invention applied.
Figure 4:
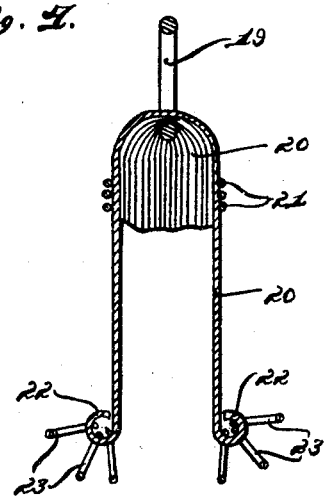
Fig. 4 is a central vertical sectional view of the invention in the form shown in Fig. 3.

In the form shown in Fig. 3 and Fig. 4 I have illustrated a pan 17 which is to be cleaned, the cleaning device comprising a ring 19. Extending over the ring 19 are a plurality of flexible strips 20 preferably made from wire metal or other similar material, these strips being doubled upon themselves and secured to the ring 19 by the strands 21 of wire passed therearound. The opposite ends of the strips 20 are each provided with eyelets 22 in which are positioned the cleaning rings 23.

The ring 19 and the body formed by the strips 20 serve as a handhold for retaining the device while the rings 23 are being moved relatively to the pan for effecting the desired cleaning and scouring.

With a bottle and pan cleaner of the class described, it is evident that an efficient cleaning of the inner surface may be effected and that this cleaning operation may be done most expeditiously.

While I have illustrated and described the preferred form of structure, I do not wish to limit myself to the precise details of structure shown, but desire to avail myself of such variations and modifications as come within the scope of the appended claims.

Having thus described my invention what I claim as new and desire to secure by Letters Patent is:

1. In a device of the class described, a retaining member; a plurality of flexible elements projected through said retaining member and doubled upon themselves; an eyelet formed on the free end of each of said flexible elements; and a plurality of rings mounted in each of said eyelets.

2. In a device of the class described, a retaining member; a plurality of flexible members projected through and doubled over said retaining member; an eyelet formed on the ends of each of said flexible members; a plurality of rings secured in each of said eyelets; and means extended around the doubled over ends of said flexible members adjacent said retaining member for locking said flexible members on said retaining member.

In testimony whereof I have signed the foregoing specification.

MATHILDE DE MARTELAERE.